Figure 3:
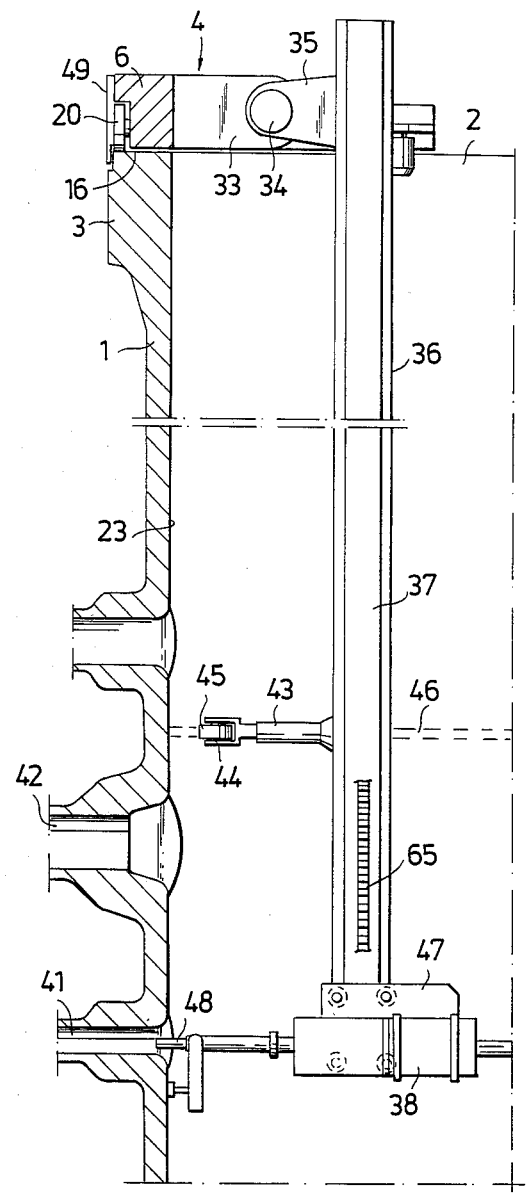

United States Patent [19]

Andersson et al.

[11] Patent Number: 4,585,610
[45] Date of Patent: Apr. 29, 1986

[54] APPARATUS FOR INSPECTING THE INTERIOR OF A REACTOR VESSEL

[75] Inventors: Björn Andersson; Alf Engding, both of Akersberga; Peter Schaub, Stockholm; Andras Agoston, Täby, all of Sweden

[73] Assignee: Tekniska Rontgencentralen AB, Stockholm, Sweden

[21] Appl. No.: 401,358

[22] Filed: Jul. 23, 1982

[30] Foreign Application Priority Data

Sep. 29, 1981 [SE] Sweden ............... 8105754

[51] Int. Cl.$^4$ .............................. G21C 17/00
[52] U.S. Cl. ................... 376/249
[58] Field of Search ............ 376/249, 245, 251

[56] References Cited

U.S. PATENT DOCUMENTS

| | | | |
|---|---|---|---|
| 4,036,686 | 7/1977 | Weilbacher et al. | 376/251 |
| 4,048,009 | 9/1977 | Weilbache | 376/245 |
| 4,217,173 | 8/1980 | Jabsen | 376/249 |
| 4,330,865 | 5/1982 | Hyde et al. | 376/249 |
| 4,345,658 | 8/1982 | Danel et al. | 376/249 |
| 4,436,694 | 3/1984 | Vassalotti et al. | 376/249 |

Primary Examiner—Sal Cangialosi
Attorney, Agent, or Firm—Kinzer, Plyer, Dorn & McEachran

[57] ABSTRACT

For the inspection of a reactor vessel (1) there is used a carriage (4) provided with wheels (15) to enable the carriage to be driven around a reactor opening (2). The carriage supports a mast (36), which is provided with inspection equipment (38) which can be driven along the mast. Known apparatus of this kind block the reactor opening, thereby to prevent other work from being carried out during an inspection period, for example such work as the change of fuel elements. According to the invention, the carriage with mast and inspection equipment are so formed that a geometric projection thereof onto a plane extending perpendicularly to the geometric axis of the cylindrical reactor vessel lies within a sector of less than 180°, with the exception of an area outside the geometric projection of the reactor hearth onto the same plane.

2 Claims, 8 Drawing Figures

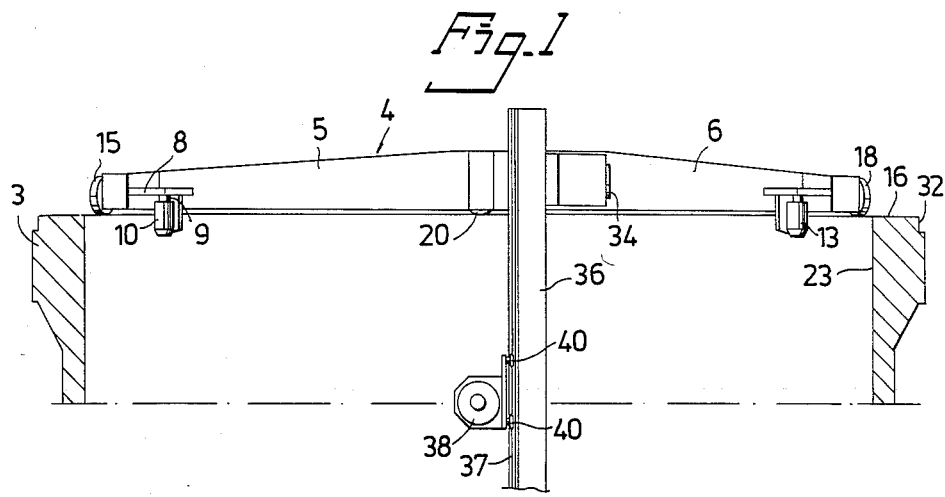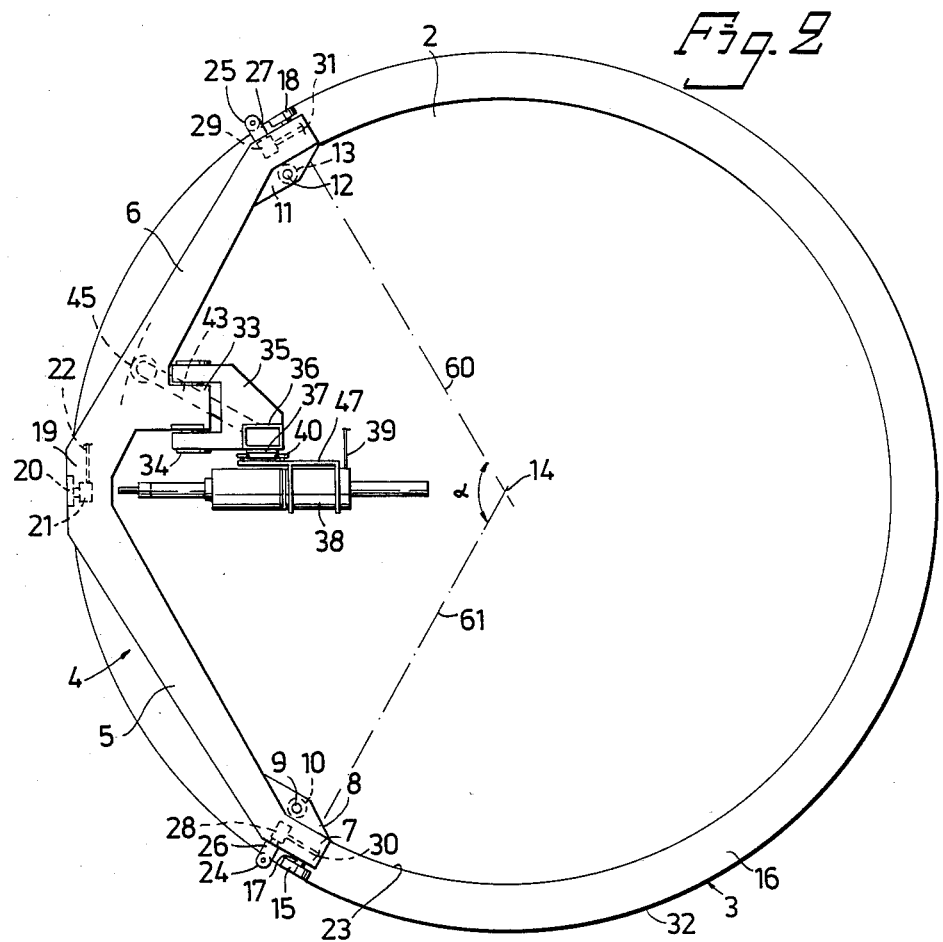

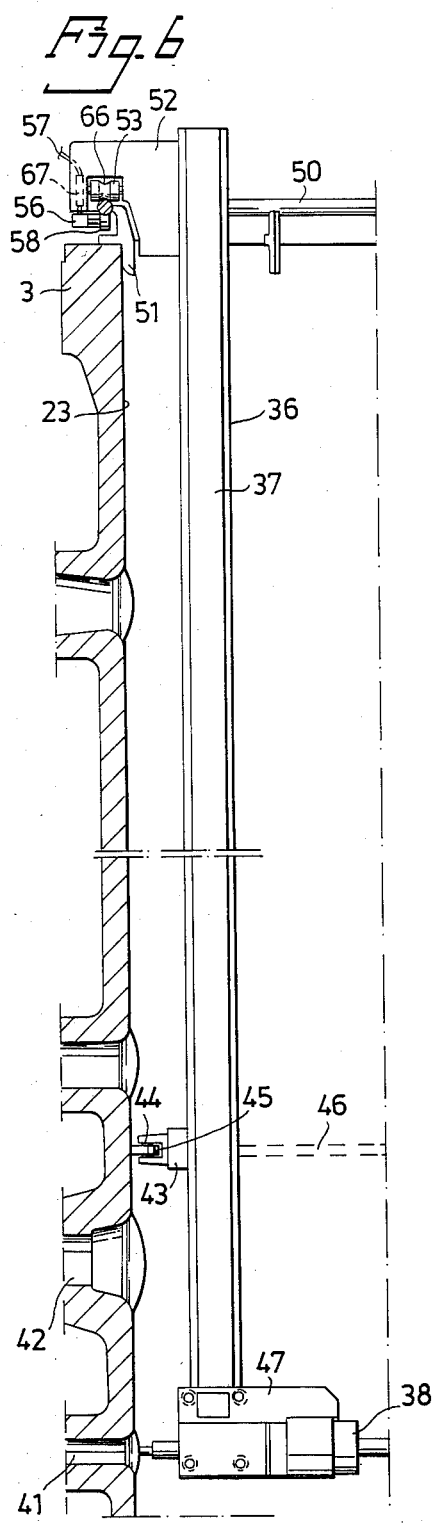
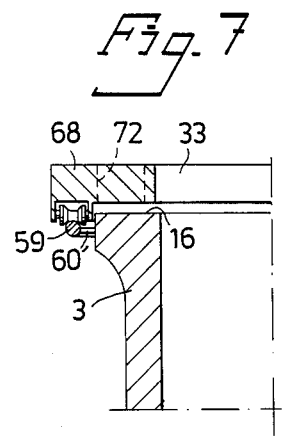
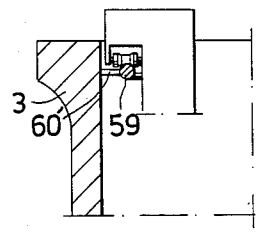

APPARATUS FOR INSPECTING THE INTERIOR OF A REACTOR VESSEL

The present invention relates to apparatus for inspecting a reactor vessel of the kind having a hearth, which includes a wheeled carriage and drive means for moving the carriage around the opening of the reactor vessel, said opening being bordered by a peripheral flange, and which further includes means for supporting a mast which is capable of being inserted into the reactor vessel and which is provided with inspection equipment arranged to be driven along the mast, and which mast, when inspecting the interior of the reactor vessel, is held with its longitudinal axis at least substantially parallel with the centre axis of the reactor vessel.

Such apparatus are well known, and normally include a carriage provided, for example, with three legs, each fitted with a wheel. The wheels subtending therebetween an angle of 120° and are arranged to co-act directly with the upper flange of the reactor vessel, said flange being exposed by lifting off the reactor-vessel cover.

The carriage carries a central mast, which coincides with the vertical cylindrical axis of the reactor vessel and which, in turn, carries exchangeable inspection equipment, by means of which the internal pipes etc. connected to the reactor vessel can be inspected. The carriage may also have the form of a rectangular frame provided with four wheels which permits the carriage to be moved around the centre axis of the reactor vessel.

A common drawback with all known apparatus of this kind is that the carriage, and normally also the mast fitted with said inspection equipment, covers such a large area of the circular opening of the reactor vessel as to make it impossible to carry out any other operations except that involving the inspection of the interior of the reactor vessel. When possible, the times at which the reactor vessel is inspected are arranged to coincide with those times during which a change of fuel elements takes place, which means that the core reactor must be shut down over the time period taken to inspect the reactor vessel and to change the fuel elements. Both operations are extremely time consuming and consequently plant losses in the form of non-delivered energy are extremely high.

Consequently, a main object of the invention is to provide apparatus of the aforementioned kind which enables inspection of the reactor vessel and, for example, changing of fuel elements to be carried out simultaneously, this object being realized by the apparatus defined in the following claims.

With apparaus so constructed, at least 180° of the volume of the reactor vessel will be completely free for enabling, for example, fuel elements to be removed and replaced, and to enable a fuel-element change to take place as the carriage is rotated around the cylinder axis of the reactor vessel. Consequently, the time during which the reactor vessel must be shut down will only be dependent upon the time taken to carry out said inspection or upon the time taken to change said fuel elements, the economic losses as a result of non-delivered energy decreasing to a corresponding degree.

Figure 4:
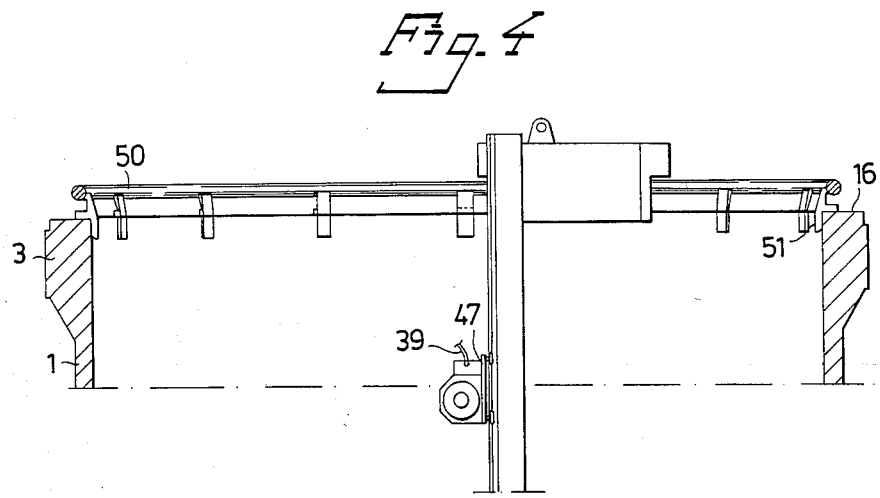
Figure 5:
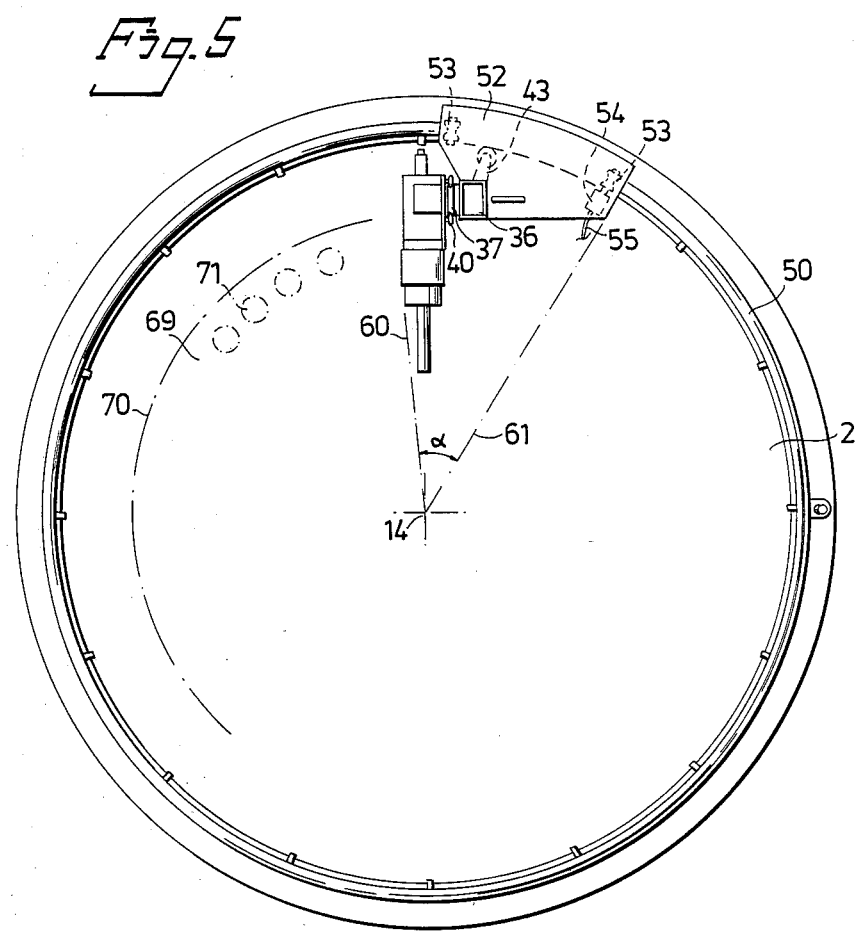

The invention will now be described in more detail with reference to the accompanying drawings, in which FIG. 1 is a vertical sectional view of the upper part of a reactor vessel having apparatus according to the invention, FIG. 2 is a top plan view of the reactor vessel provided with said apparatus according to the invention, FIG. 3 is a vertical, central sectional view of part of the wall of the reactor vessel and carriage frame, and illustrates the mast carried by the carriage with the inspection equipment being shown in a simplified manner, FIG. 4 is a vertical sectional view of a further embodiment of apparatus for inspecting the interior of a reactor vessel, and of the flange surface, FIG. 5 is a top plan view of the apparatus illustrated in FIG. 4, FIG. 6 is a vertical, central sectional view of part of the wall of the reactor vessel and illustrates the mast according to FIG. 4 carried by the carriage, said Figure also illustrating inspection equipment in a simplified manner, FIG. 7 illustrates a modified carriage track, and FIG. 8 illustrates a further modified carriage track.

Illustrated in FIGS. 1, 2, 3 is a reactor vessel 1 which is submersed in a water-filled tank (not shown). The cover of the reactor vessel 1 is removed, and arranged on the flange 3 bordering opening 2 of the reactor vessel 1 is a carriage 4 which, in the illustrated embodiment, has the form of two arms 5 and 6 which are rigidly connected together so as to form angles therebetween. The arm 5 has an end portion 7 on which is mounted a bracket structure 8 having a fixed shaft 9 on which a guide wheel 10 is freely rotatable. The arm 6 is provided with a corresponding bracket structure 11 having a fixed shaft 12 carrying a freely rotatable guide wheel 13. The two shafts 9 and 12 are parallel with the cylinder axis 14 of the reactor vessel 1. The end portion 7 of arm 5 is also provided with a freely rotatable wheel 15 arranged to run on the upper, planar circular surface 16 of the flange 3. The wheel 15 is rotatably journalled on a shaft 17, which is perpendicular to the centre axis 14. A further wheel 18 is arranged in a corresponding manner on the end portion of arm 6 and runs on the upper planar, cylindrical surface 16 of the flange 3. The arms 5 and 6 of the illustrated embodiment are of equal length and are provided at their common centre portion 19 with a carriage wheel 20 which is connected to an electric motor 21. Voltage is supplied to the electric motor 21 through a cable 22, which is drawn up to the reactor hall (not shown) lying above the reactor vessel 1. The three carriage wheels may be of equal size and their axes may lie in a common plane. When voltage is supplied to the motor, the wheel 20, which lies against track 16, will cause the carriage to move around the centre axis 14 of the reactor vessel 1. The two guide wheels 10 and 13 lie against the inner, circular-cylindrical wall 23 of the reactor vessel 1 and co-act with opposite guide wheels 24 and 25 respectively. These guide wheels are journalled for free movement on shafts which may be parallel with the shafts 9 and 12. The guide wheels 24 and 25 and the shafts of the wheels are carried on journal arms 26 and 27 respectively. The journal arms 26 and 27 can be displaced in the radial direction of the circular-cylindrical flange 3 by means, for example, of pneumatic piston-cylinder devices 28 and 29 respectively, to which working medium is supplied through hoses 30 and 31. When the carriage is lowered onto the flange 3 of the reactor vessel 1 by means not shown, the guide wheels 24 and 25 are held in an outwardly extended position by means of the piston-cylinder devices 28 and 29, so that the flange 3 is able to pass freely between the two mutually-co-acting guide wheels 10, 24 and 13, 25 respectively. The arms 26 and 27 are then drawn in by means of said piston-cylinder devices 28, 29 and the flange defined by the inner cylindrical surface 23 and the outer cylindrical surface 32 co-axial with said inner cylindrical surface is firmly gripped between the two wheel pairs. The shafts of the guide wheels 10 and 24 lie on a radius of the reactor vessel similar to the shafts of the guide wheels 13 and 25 and the distance between the shaft line and the centre axis 14 may be equal to the distance between the shaft 12 and the centre axis 14. Since the distance between the flange surfaces 23 and 32 is constant around the whole of the reactor vessel, any given point on the carriage will lie at a constant distance from the centre axis 14 irrespective of the position to which the carriage has been rotated.

The arm 6 is provided with a fixed bracket structure 33 through which there is passed a shaft 34 having pivotally journalled on the ends thereof a fork-shaped member 35. Fixedly mounted to the fork-shaped member 35 is a mast 36, which in the illustrated embodiment is of quadrangular cross-section. One side surface of the mast 36 is provided with a plate 37 which forms a track or rail for a carriage 47 carrying inspection equipment 38, for example ultrasonic equipment, a TV-camera or the like. The carriage 47 is provided with a drive motor supplied with voltage through a cable 39 extending up to the reactor wall. In the illustrated embodiment, the carriage is assumed to be driven by said motor via a pinion on the motor shaft and a rack 65 (indicated in FIG. 3) mounted on the mast 36. Thus, the inspection equipment can be moved along the mast 36 to inspect, for example, pipe stubs 41, 42. Also mounted on the mast 36 is a support arm 43 which carries on one end a wheel 45 arranged for rotation around a shaft or axis 44. The shaft 44 is parallel with the mast 36 and the wheel 45 is intended to lie against and roll on the inner surface of the reactor vessel 1, and to roll along a track 46 when the carriage 4 rotates around the centre axis 14, as indicated by broken lines in FIG. 3. The support arm 43 is preferably provided with an inner part and an outer part, and the outer part is in screw-thread engagement with the inner part thereby to enable the length of the support arm 43 to be finely adjusted. Preferably, the support arm 43 is detachably secured to the mast, by means not shown, so that said arm can be moved to different locations on the mast.

This pivoting of the mast 36 about the shaft 34 permits the mast to pivot relative to the inner wall 23 of the reactor vessel, said inner wall normally being rough and uneven. The effect of these irregularities in the surface of the inner wall 23 is transferred by means of the support arm 43, and because of the ability of the mast 36 to pivot, the carriage 4 will not be subjected to tipping or tilting forces. The pivot arrangement 33, 34, 35 is so designed as to enable mast 36 to be swung through an angle of 90° clockwise in FIG. 3, to a position completely beneath the carriage 4, which greatly facilitates the laying, for example, of the floor in the reactor hall subsequent to the apparatus as a whole being lifted from the reactor vessel by means of a standing crane or overhead traverse crane.

In order to ensure full stability of the carriage 4, the centre of gravity of mast 36 and inspection equipment 38 lies within the connecting line between the carriage wheels on the end parts of the carrier, and suitably counterweights are also arranged, for example, above the wheel 20 or at some other suitable location. An important advantage afforded by a mast which is not mounted centrally, in accordance with the invention, is that the inspection equipment will be automatically located closer to the inner wall 23 of the reactor vessel. Consequently, when the inspection equipment 38 is intended for inspecting pipe stubs or pipe connectors, the tube 48, which carries a TV-camera, an ultrasonic head or the like, for example, on the end thereof, can be made shorter than when the mast 36 is placed in the centre of the reactor vessel in the conventional manner, and the drive means for axially displacing the tube 48 and for rotating the same around the long axis can be made simpler.

FIG. 3 illustrates a safety means 49, which may comprise, for example, plates fixed to the carriage 4 with the ends of said plates located beneath the surface 16 of the reactor flange 3 without contacting said surface.

FIGS. 4–6 illustrate a further, simplified embodiment of apparatus for inspecting the interior of a reactor vessel, and also show the flange surface.

In FIGS. 4–6 there is shown a reactor vessel 1, which lies immersed in a water-filled tank (not shown). The cover or lid of the reactor vessel 1 has been removed, and arranged on the flange 3 encircling the opening 2 of the vessel 1 is a circular track 50 which abuts the inside 23 and the surface 16 of the flange 3 of said vessel via supports 51. The track 50 is of circular cross-section and the centre of the track coincides with the centre 14 of the reactor vessel. The track 50 is mounted on supports 51 around the whole of the periphery of the track. The track 50 together with supports 51 forms a unit, which can be removed from the flange 3 of the reactor vessel. The track 50 carries a carriage 52 provided with two carriage wheels 53, which in the illusttrated embodiment have a V-shaped groove 66. The carriage wheels 53 are rotatably mounted on respective shafts, and at least one of said wheels is driven by drive means 54. The drive means 54 may be an electric motor, to which voltage is supplied through a cable 55, which is drawn up to the reactor hall (not shown) located above the reactor vessel. In the illustrated embodiment, there is mounted on the carriage 52 two pivotable arms 56 which are moveable parallel with the plane of the track 50, and also at right angles to said plane. Only one arm is illustrated in FIG. 6. The arms 56 can be moved by means of pneumatic piston motors 67, to which pressure medium is passed through hose 57 from the reactor hall. Arranged on the outer end of the arm 56 is a shaft which carries a freely rotatable pressure roller 58. Fixedly connected to the carriage 52 is a mast 36, which is also of quadrangular cross-section. One side surface of the mast 36 is provided with a plate 37 which forms a track or rail for a carriage 47, which may carry inspection equipment 38, for example ultrasonic equipment, a TV-camera or the like. The carriage 47 is provided with a drive motor, to which voltage is supplied through a cable 39 which passes up to the reactor hall. The wheel 40 co-acting with the track 37 is assumed in this case to be driven by said motor. Thus, the inspection equipment can be moved along the mast 36, for inspecting, for example, pipe stubs 41, 42 and flange surface 16. Also mounted on the mast 36 is a support arm 43 which carries on one end a wheel 45 rotatable about a shaft 44. The shaft 44 is parallel with the mast 36 and the wheel 45 is intended to abut and roll on the inner surface of the reactor vessel 1, and to roll along a path 46 as the carriage 52 turns around the centre axis 14, said path 46 being shown in broken lines in FIG. 6. The support arm 43 preferably comprises an inner part and an outer part, said outer part being screwed into the inner part so as to enable the length of the support arm 43 to be precisely adjusted. Preferably, the support arm 43 is detachably mounted on the mast by means not shown, so as to enable the arm to be displaced to selected locations on the mast.

When wishing to inspect the interior of a reactor vessel and/or the flange surface of said vessel, and the cover or lid (not shown) of the reactor vessel has been lifted off, the track 50 together with supports 51 is lowered into position on the flange 3 of the reactor vessel, and the carriage 52 with mast 36 and inspection equipment is then lowered so that the carriage wheels 53 rest against the track 50. The pressure roller 58, which in this embodiment is allotted a respective wheel 53, is swung outwardly and drawn downwardly. Respective arms 56 are operated by the piston motor 67 in a manner to cause said arms to swing inwardly and to be drawn upwardly. The pressure rollers 58 are then positioned beneath the track 50, said track being firmly clamped between said pressure rollers and respective carriage wheels 53.

In the aforegoing it has been assumed that the carriage wheels 15, 18, 20 run on the upper planar surface 16 of the reactor flange 3, and that carriage wheels 53 run on a track 50 lowered onto the reactor flange 3. It is also possible, however, to arrange a separate track for said carriage wheels on the inner and/or outer surface of the flange. An extremely advantageous embodiment of separate tracks is illustrated in FIGS. 7 and 8. Arranged around the flange 3 of the reactor vessel, on the outer surface or inner surface of said flange, is a circular, continuous track 59 which is held permanently mounted to the reactor vessel by means of bracket structures 60' or some other suitable securing means.

In the embodiment illustrated in FIGS. 1 and 2, the angle α between the centre axis 14 and the reactor vessel and the extension lines 60 and 61 of the carriage-wheel shafts of said end portions is 120°, and the mast 36, support leg 43 and the inspection equipment 38 used are located within the circle-sector defined by said extension lines 60 and 61, i.e. a sector of 240° is fully exposed, thereby enabling, for example, fuel elements to be changed within this latter sector at the same time as the reactor vessel is being inspected. In the embodiment illustrated in FIGS. 4 and 5, the angle α between the centre axis 14 of the reactor vessel and the radius 61 through one end point of the carriage and a radius 60 extending to the outermost edge portion of the testing equipment 38 is equal to 40°, and the mast 36, the support leg 43, the carriage 52 and the equipment used are located within the circle-sector defined by the radii 60 and 61, i.e. a sector of 320° is fully exposed.

It has been assumed in the aforegoind that the part of the carriage carrying the carriage wheels lies within a circle-sector less than 180°, although it is also possible to distribute the carriage wheels around a narrow ring extending on the upper surface 16 of the flange or on a separate track, and then in particular on a track, for example, of the kind illustrated in FIG. 7 arranged on a further cylindrical surface outside the flange. One such annular carrier is indicated at 68; it will be understood that this annulus will not cover any part of the free opening of the reactor vessel. The bracket structure 33 (FIG. 2), for example, is then mounted on the annulus 68, said bracket structure carrying the mast 36 and inspection equipment 38. If the mast 36 is not pivotable, no support legs etc. are required in this case.

This means, similar to the other embodiments, that the geometric projection of those parts of the carriage which lie radially inwardly of the inner cylindrical surface 23 of the reactor flange, onto a plane extending perpendicularly to the centre axis 14 of the reactor vessel, the geometric projection of the mast and any support legs, and a geometric projection of the inspection equipment will lie within a circle-sector whose centre angle is less than 180°.

The aforementioned annular carrier 68 may also comprise a broken ring, not including an angle of 360°. Even though the ring should project inwardly of the inner wall of the flange 3 along the whole or part of the periphery of the opening 2, this implies no disadvantage provided that access can still be had to the reactor hearth 69, indicated in FIG. 5, the outer defining line or contour of said hearth being shown at 70. The reference 71 identifies fuel elements. The defining line 70, which is here shown to be circular and to extend around the whole of the reactor hearth, defines an area which, according to the invention, shall be free, at least within a sector of 180°, to enable a fuel-element change to take place. Construction elements or the like may be located outside this defining line 70, that is to say when a ring-shaped carriage is used, the inner edge of the ring may well project inwardly above the free opening 2 of the reactor vessel, although the geometric projection of the inwardly projecting part or parts onto a projection plane extending perpendicular to the axis 14 may not project into the geometric projection of the hearth on the same plane, with the exception of those parts which lie within said circle-sector, the angle of which is less than 180°. If the carriage includes a ring which covers the flange surface, there is suitably arranged a through-passing opening 72 capable of being reached by the inspection equipment, and which thus enables the flange surface 16 to be inspected.

We claim:
1. An apparatus for inspecting a reactor vessel having a reactor hearth, the apparatus including a carriage provided with wheels and a drive means for moving the carriage around the rim of the reactor vessel opening,
   a mast mounted on the carriage and extending downwardly into the reactor vessel substantially parallel to the center axis of the reactor vessel,
   said mast being pivotally mounted on said carriage about a horizontal axis,
   a stabilizing arm mounted on the mast and having a guide wheel at the end thereof engaging the wall of the reactor vessel, and
   a viewing device mounted on the mast and adjustably movable along at least a portion of the height of the mast.

2. An apparatus for inspecting a reactor vessel having a reactor hearth, the reactor vessel having an opening defined by a rim and having rail positioned around the opening,
   an arcuate shaped carrier having wheels which ride on the rail to permit the carriage to move completely around the reactor vessel opening,
   The arcuate shaped carrier extending radially into the vessel opening a distance less than the radius of the opening,
   drive means to move the carriage along the track around the reactor vessel opening,
   a mast mounted on the carriage and extending into the reactor vessel,
   a stabilizing arm mounted on the mast near the lower end thereof and having a wheel at the free end of the arm which engages the inner wall of the reactor vessel, and
   a viewing device mounted on the mast and adjustably movable along at least a portion of the height of the mast.

* * * * *